(12) United States Patent
     Liu et al.

(10) Patent No.: US 12,238,248 B2
(45) Date of Patent: Feb. 25, 2025

(54) APPARATUS, METHOD, AND SYSTEM FOR MONITORING IMAGE-FORMING APPARATUS, AND STORAGE MEDIUM

(71) Applicant: Zhuhai Pantum Electronics Co., Ltd., Zhuhai (CN)

(72) Inventors: Zhongsong Liu, Beijing (CN); Yuanpei Zhao, Beijing (CN); Guodong Wang, Zhuhai (CN); Heting Zhao, Beijing (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/462,362

(22) Filed: Sep. 6, 2023

(65) Prior Publication Data

US 2023/0412742 A1    Dec. 21, 2023

Related U.S. Application Data

(63) Continuation of application No. PCT/CN2022/077033, filed on Feb. 21, 2022.

(30) Foreign Application Priority Data

Mar. 12, 2021    (CN) .................. 202110270819.X

(51) Int. Cl.
    *G06F 15/00*    (2006.01)
    *H04N 1/00*     (2006.01)
(52) U.S. Cl.
    CPC ................ *H04N 1/00323* (2013.01)

(58) Field of Classification Search
    None
    See application file for complete search history.

(56) References Cited

U.S. PATENT DOCUMENTS

2005/0068565 A1* 3/2005 Maeda ............... H04L 61/4541
                                                      358/1.15
2008/0137125 A1* 6/2008 Naitoh .................... G06F 3/123
                                                      358/1.14

(Continued)

FOREIGN PATENT DOCUMENTS

CN    107577443 A    1/2018
CN    107800913 A    3/2018

(Continued)

*Primary Examiner* — Mark R Milia
(74) *Attorney, Agent, or Firm* — ANOVA LAW GROUP PLLC

(57) ABSTRACT

The present disclosure provides an apparatus, a method and a system for monitoring an image-forming apparatus, and a storage medium. The apparatus includes a device search module, configured to search and read an image-forming apparatus and image-forming-apparatus information in a local area network; an internal storage apparatus, configured to store the image-forming-apparatus information after search; and a display interface, configured to display the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored.

12 Claims, 6 Drawing Sheets

(56) References Cited

U.S. PATENT DOCUMENTS

| 2010/0225957 | A1* | 9/2010 | Liu | G06F 3/1285 |
| | | | | 358/1.15 |
| 2011/0242599 | A1* | 10/2011 | Ohara | H04L 61/4541 |
| | | | | 358/1.15 |

FOREIGN PATENT DOCUMENTS

| CN | 109478127 A | 3/2019 |
| CN | 112217649 A | 1/2021 |
| CN | 113010122 A | 6/2021 |
| JP | 2015225456 A | 12/2015 |

* cited by examiner

APPARATUS, METHOD, AND SYSTEM FOR MONITORING IMAGE-FORMING APPARATUS, AND STORAGE MEDIUM

CROSS-REFERENCE TO RELATED APPLICATION

This application is a continuation application of PCT Patent Application No. PCT/CN2022/077033, filed on Feb. 21, 2022, which claims the priority to Chinese patent application No. 202110270819.X, filed on Mar. 12, 2021, in the China National Intellectual Property Administration, the entirety of all of which is incorporated herein by reference.

TECHNICAL FIELD

The present disclosure generally relates to the field of image-forming technology and, more particularly, relates to an apparatus, a method and a system for monitoring an image-forming apparatus, and a storage medium.

BACKGROUND

Nowadays, whether it is a large enterprise, a small enterprise, a government agency, a commercial institution or a private enterprise, computers and image-forming apparatuses are frequently used in daily operations. Computers and image-forming apparatuses are commonly used for various business functions, including the creation of internal documents, such as memos, presentations, various records and processes and the like, and the creation of documents for external use, such as brochures or statements for patients, customers and the like.

Currently, in the case of monitoring image-forming apparatuses through programs on computer systems, users may need to collect information on all image-forming apparatuses in local area network environment, and real-time analysis becomes considerably important. When the IP address of a monitored image-forming apparatus in the network changes, the monitoring apparatus cannot obtain the information of such image-forming apparatus according to the IP address, which may negatively affect the print work and result in low reliability.

SUMMARY

One aspect of the present disclosure provides an apparatus for monitoring an image-forming apparatus. The apparatus includes a device search module, configured to search and read an image-forming apparatus and image-forming-apparatus information in a local area network; an internal storage apparatus, configured to store the image-forming-apparatus information after search; and a display interface, configured to display the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored.

Another aspect of the present disclosure provides a method for monitoring an image-forming apparatus. The method includes searching and reading an image-forming apparatus and image-forming-apparatus information in a local area network; storing the image-forming-apparatus information after search; and displaying the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored.

Another aspect of the present disclosure provides a system for monitoring an image-forming apparatus. The system includes a computer device and an image-forming apparatus. The computer device is installed with an apparatus for monitoring the image-forming apparatus and includes a resident memory process. The apparatus for monitoring the image-forming apparatus includes a device search module, configured to search and read an image-forming apparatus and image-forming-apparatus information in a local area network; an internal storage apparatus, configured to store the image-forming-apparatus information after search; and a display interface, configured to display the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored.

Another aspect of the present disclosure provides a non-transitory computer-readable storage medium. The storage medium includes a stored program, where when the stored program is executed, a device where the storage medium is located is controlled to execute above-mentioned method for monitoring the image forming apparatus.

Another aspect of the present disclosure provides a computer device. The computer device includes a memory and a processor, where the memory is configured to store information including program instructions; the processor is configured to control execution of the program instructions; and when the program instructions are loaded and executed by the processor, above-mentioned method for monitoring the image forming apparatus is executed.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in following description are merely some embodiments of the present disclosure. For those skilled in the art, other drawings may be obtained in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

Terms used in embodiments of the present disclosure are only for the purpose of describing specific embodiments and are not intended to limit the present disclosure. Singular forms "a", "said" and "the" used in embodiments of the present disclosure and the appended claims are also intended to include plural forms unless the context clearly indicates otherwise.

It should be understood that the term "and/or" used herein is only an association relationship describing associated objects, indicating that there may be three relationships. For example, A and/or B may indicate that A exists alone, A and B exist simultaneously, and B exists alone. In addition, the character "/" in the present disclosure indicates that the contextual objects are in an "or" relationship.

It should be understood that although the terms "first", "second" and the like may be configured to describe set thresholds in embodiments of the present disclosure, these set thresholds should not be limited to these terms. These terms are only configured to distinguish set thresholds from one another. For example, without departing from the scope of embodiments of the present disclosure, the first set threshold may also be invoked the second set threshold; and similarly, the second set threshold may also be invoked the first set threshold.

Figure 1:
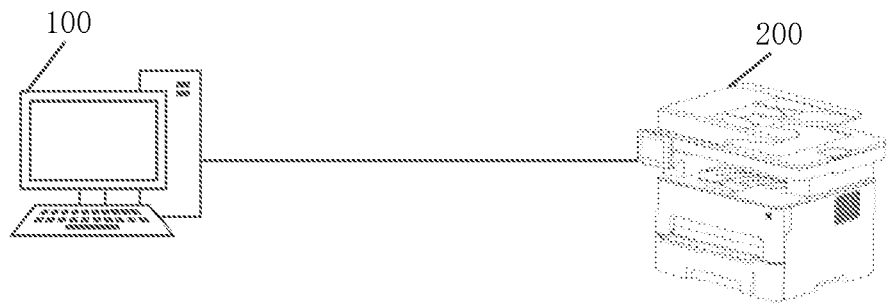
FIG. 1 illustrates a structural schematic of a system for monitoring an image-forming apparatus according to exemplary embodiments of the present disclosure.

FIG. 1 illustrates a structural schematic of a system for monitoring an image-forming apparatus according to exemplary embodiments of the present disclosure. As shown in FIG. 1, the system may include a computer device 100 and an image-forming apparatus 200, where the computer device 100 and the image-forming apparatus 200 may be connected in a specified manner.

As an optional solution, the computer device 100 and the image-forming apparatus 200 may be connected to each other in a wired manner. For example, the wired manner may include, but may not be limited to, universal serial bus (USB) manner. As another optional solution, the computer device 100 and the image-forming apparatus 200 may be connected to each other in a wireless manner. For example, the wireless manner may include, but may not be limited to, wireless local area network (WLAN), Bluetooth (BT), near field communication technology (NFC), and infrared technology (IR).

Figure 2:
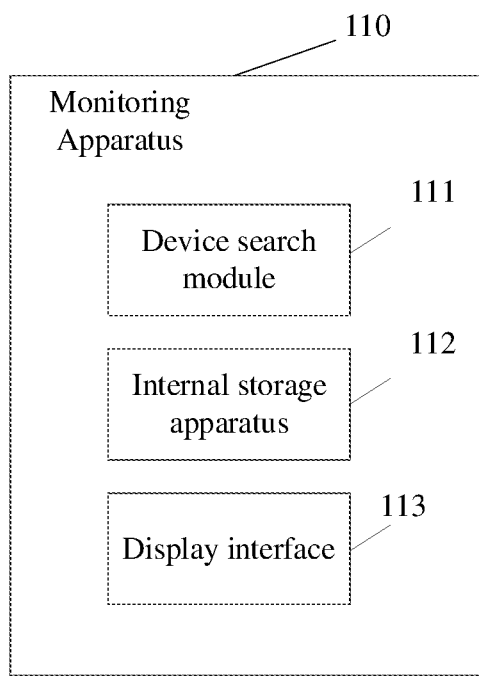
FIG. 2 illustrates a structural schematic of an apparatus for monitoring an image-forming apparatus according to exemplary embodiments of the present disclosure.

The computer device 100 may be installed with an apparatus 110 for monitoring the image-forming apparatus. FIG. 2 illustrates a structural schematic of the apparatus for monitoring the image-forming apparatus according to exemplary embodiments of the present disclosure. As shown in FIG. 2, the monitoring apparatus 110 may include a device search module 111, an internal storage apparatus 112 and a display interface 113, where the monitoring apparatus 110 may be a program developed based on C++ language and QT framework.

Figure 3:
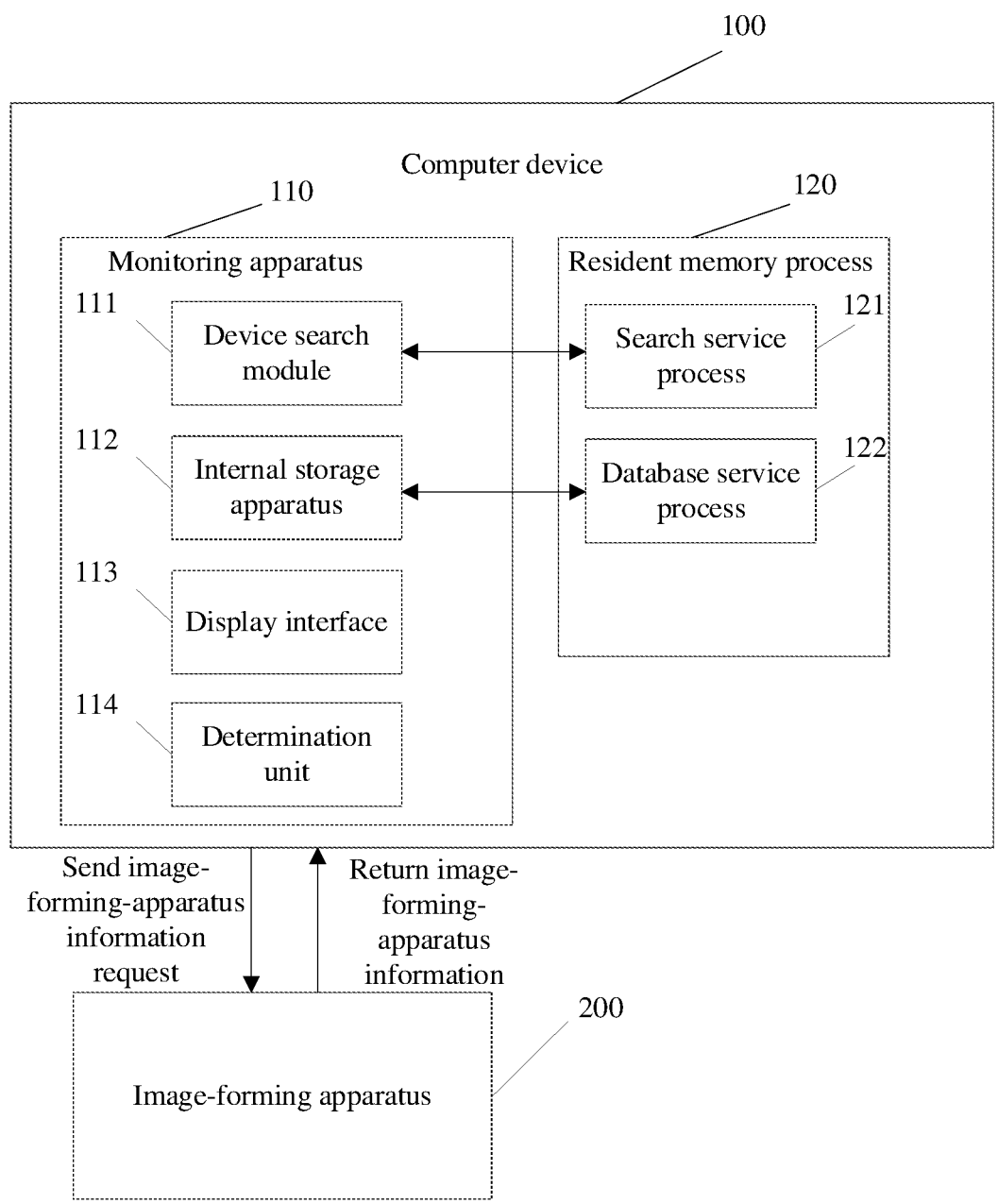
FIG. 3 illustrates a connection topology schematic of a system for monitoring an image-forming apparatus according to exemplary embodiments of the present disclosure.

The computer device 100 may include a resident memory process 120. FIG. 3 illustrates a connection topology schematic of a system for monitoring the image-forming apparatus according to exemplary embodiments of the present disclosure. As shown in FIG. 3, the resident memory process 120 may include a search service process 121.

In embodiments of the present disclosure, the device search module 111 may be configured to search and read the image-forming apparatus and image-forming-apparatus information in a local area network. For example, the device search module 111 may search and read the image-forming apparatus and image-forming-apparatus information in the local area network by invoking the search service process.

In embodiments of the present disclosure, the internal storage apparatus 112 may be configured to store searched image-forming-apparatus information.

In embodiments of the present disclosure, the display interface 113 may be configured to display the image-forming-apparatus information stored in the internal storage apparatus for a user to select the image-forming-apparatus information to-be-monitored from the image-forming-apparatus information and to monitor the image-forming apparatus to-be-monitored.

As shown in FIG. 3, the resident memory process 120 may further include a database service process 122, and the monitoring apparatus 110 may further include a determination unit 114. The database service process 122 may be a computer system process or an arbitrary process based on database management software and the computer system, which may not be limited in embodiments of the present disclosure.

In embodiments of the present disclosure, the determination unit 114 may be configured to determine whether at least a part of the image-forming-apparatus information to-be-monitored is consistent with at least a part of the monitored image-forming-apparatus information; if at least the part of the image-forming-apparatus information to-be-monitored is consistent with at least the part of the monitored image-forming-apparatus information, may be configured to update the monitored image-forming-apparatus information. The monitoring apparatus 110 may obtain the monitored image-forming-apparatus information by invoking the database service process 122, and the monitored image-forming-apparatus information may be stored in the database.

The resident memory process 120 is also known as a terminate-and-stay resident program (TSR program). The resident memory process 120 may return control to an operating system after loading itself into the memory, and then TSR may wait to be activated when the user presses specified key combination (e.g., hot key) or generates a corresponding interruption in the background, currently running program may be intermediately interrupted, and immediate access to the service the resident memory process provides may be allowed.

In embodiments of the present disclosure, the image-forming-apparatus information may include, but may not be limited to, serial number, brand, model and IP address.

Figure 4:
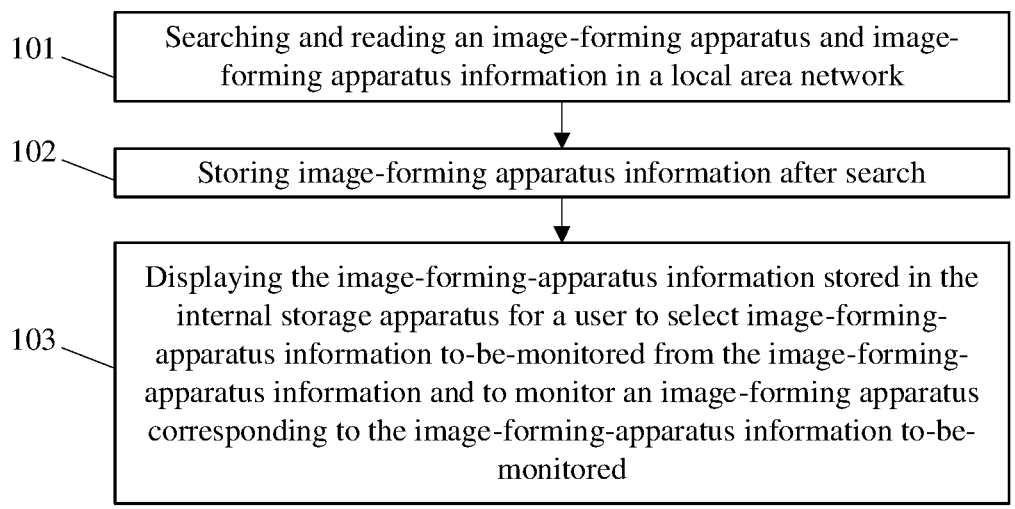
FIG. 4 illustrates a flowchart of a method for monitoring an image-forming apparatus according to exemplary embodiments of the present disclosure.

In embodiments of the present disclosure, the system for monitoring the image-forming apparatus shown in FIG. 3 may be further configured to execute the method for monitoring the image-forming apparatus shown in FIG. 4, which may not be described in detail herein.

In solutions of embodiments of the present disclosure, the image-forming apparatus and image-forming-apparatus information in the local area network may be searched and read; the image-forming-apparatus information after search may be stored; the image-forming-apparatus information may be displayed for the user to select the image-forming-apparatus information to-be-monitored from the image-forming-apparatus information and to monitor the image-forming apparatus corresponding to the image-forming-apparatus information to-be-monitored. When the IP address of the image-forming apparatus changes, the monitoring apparatus may still query the image-forming apparatus, thereby improving the reliability of the image-forming apparatus.

FIG. 4 illustrates a flowchart of a method for monitoring the image-forming apparatus according to exemplary embodiments of the present disclosure. As shown in FIG. 4, the method may include following exemplary steps.

At 101, the image-forming apparatus and image-forming-apparatus information in the local area network may be searched and read.

At 102, the image-forming-apparatus information after search may be stored.

At 103, the image-forming-apparatus information may be displayed for the user to select the image-forming-apparatus information to-be-monitored from the image-forming-apparatus information and to monitor the image-forming apparatus corresponding to the image-forming-apparatus information to-be-monitored.

In solutions of embodiments of the present disclosure, the image-forming apparatus and image-forming-apparatus information in the local area network may be searched and read; the image-forming-apparatus information after search may be stored; the image-forming-apparatus information may be displayed for the user to select the image-forming-apparatus information to-be-monitored from the image-forming-apparatus information and to monitor the image-forming apparatus corresponding to the image-forming-apparatus information to-be-monitored. When the IP address of the image-forming apparatus changes, the monitoring apparatus may still query the image-forming apparatus, thereby improving the reliability of the image-forming apparatus.

Figure 5:
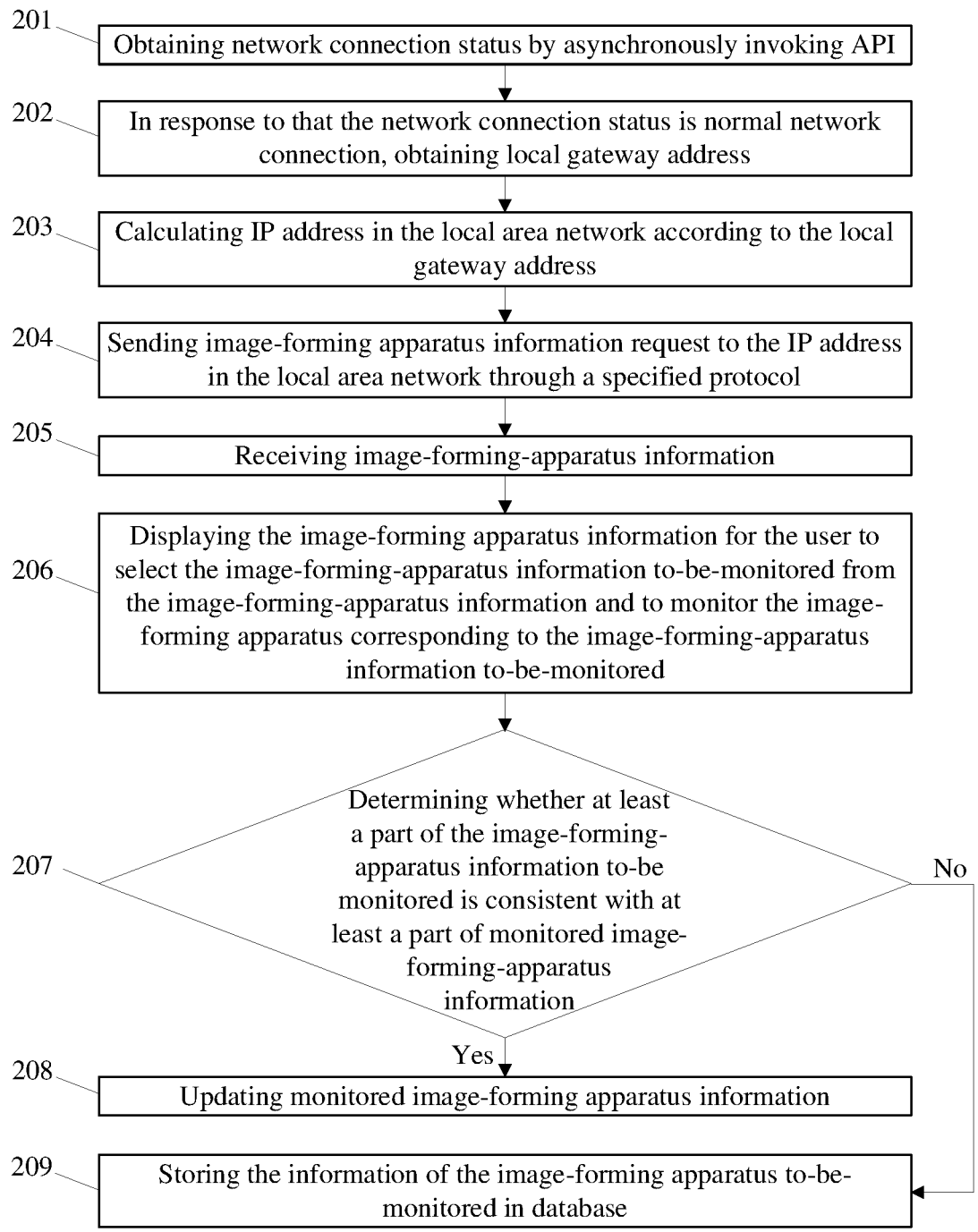
FIG. 5 illustrates another flowchart of a method for monitoring an image-forming apparatus according to exemplary embodiments of the present disclosure.

FIG. 5 illustrates another flowchart of a method for monitoring the image-forming apparatus according to exemplary embodiments of the present disclosure. As shown in FIG. 5, the method may include following exemplary steps.

At 201, a network connection status may be obtained by asynchronously invoking an application programming interface (API).

In embodiments of the present disclosure, each step may be executed by a computer device which may have network communication function and may be installed with the monitoring apparatus.

In embodiments of the present disclosure, the monitoring apparatus may include the device search module; the device search module may invoke the search service process; the search service process may obtain the network connection status of the computer device by invoking the API asynchronously; and the network connection status may include normal network connection or abnormal network connection. If the network connection status includes normal network connection, it indicates that the computer device has been connected to the local area network, and exemplary step 202 may be executed; and if the network connection status includes abnormal network connection, it indicates that the computer device is not connected to the local area network, and the process may end.

At 202, in response to that the network connection status is normal network connection, the address of a local gateway may be obtained.

In embodiments of the present disclosure, if the computer device has been connected to the local area network, the device search module of the monitoring apparatus may obtain local gateway address according to a specified time interval by invoking the search service process. The specified time interval may be configured according to actual conditions, which may not be limited in embodiments of the present disclosure.

At 203, the IP address in the local area network may be calculated according to local gateway address.

In embodiments of the present disclosure, the IP addresses may be all IP addresses in the local area network where the computer device is located.

At 204, an image-forming-apparatus information request may be sent to the IP address in the local area network through a specified protocol.

In embodiments of the present disclosure, the image-forming apparatus may have network communication function.

In embodiments of the present disclosure, the specified protocol may be simple network management protocol (SNMP). For example, the device search module of the monitoring apparatus may communicate one by one according to all IP addresses by invoking the search service process to obtain the type of network device corresponding to current communicating IP address; and if the IP address returns the type of the image-forming apparatus, the image-forming-apparatus information request may be further sent through SNMP, thereby requesting that the image-forming-apparatus information may be obtained.

At 205, the image-forming-apparatus information may be received.

In embodiments of the present disclosure, the image-forming-apparatus information may include, but may not be limited to, the serial number, brand, model and IP address of the image-forming apparatus. A serial number may be configured to uniquely identify one image-forming apparatus. The serial number of the image-forming apparatus may be fixed by the manufacturer in the memory of the image-forming apparatus and cannot be modified by the user. The serial number may be obtained through firmware communication of the image-forming apparatus. The serial number of image-forming apparatus fabricated may not be reused. In addition, each image-forming apparatus manufacturer may have a different manner of defining the serial number, such that it is accurate and reliable to use the serial number as the unique identifier of the image-forming apparatus.

Furthermore, the image-forming-apparatus information may be stored in the internal storage apparatus of the monitoring apparatus.

At 206, the image-forming-apparatus information may be displayed for the user to select the image-forming-apparatus information to-be-monitored from the image-forming-apparatus information and to monitor the image-forming apparatus corresponding to the image-forming-apparatus information to-be-monitored.

In embodiments of the present disclosure, the monitoring apparatus may read stored image-forming-apparatus information from the internal storage apparatus, and display the image-forming-apparatus information through the display interface of the monitoring apparatus; and the user may check the image-forming apparatus information through the display interface, select the image-forming apparatus information to-be-monitored, and monitor the image-forming apparatus corresponding to the image-forming apparatus information to-be-monitored.

As an optional solution, the display interface may display information of the image-forming apparatuses which is not monitored. The IP address of the image-forming apparatus which is not monitored may be different from the IP address of the image-forming-apparatus information monitored. For example, the display interface may display information of a printer once being monitored, having the printer serial number stored by the monitoring apparatus, and with the IP address now changed.

As an optional solution, the monitoring apparatus display interface may display the image-forming-apparatus information in a list form or may display the image-forming-apparatus information in other forms. Embodiments of the present disclosure may not limit the display form of the image-forming-apparatus information.

At 207, whether at least a part of the image-forming-apparatus information to-be-monitored is consistent with at least a part of the monitored image-forming-apparatus information may be determined. If yes, 208 may be executed; if no, 209 may be executed.

In embodiments of the present disclosure, the monitoring apparatus may obtain the monitored image-forming-apparatus information by invoking the database service process. The monitored image-forming-apparatus information stored in the database may include, but may not be limited to, the serial number, brand, model and IP address of the image-forming apparatus.

In embodiments of the present disclosure, if the monitoring apparatus determines that at least a part of the image-forming apparatus information to-be-monitored is consistent with at least a part of the monitored image-forming-apparatus information, it indicates that the image-forming apparatus corresponding to the image-forming-apparatus information to-be-monitored may be an image-forming apparatus that has been monitored before and only other information change may cause the image-forming apparatus to be not monitored, and 208 may continue to be executed; and if the monitoring apparatus determines that at least a part of the image-forming apparatus information to-be-monitored is not consistent with at least a part of the monitored image-forming-apparatus information, it indicates that the image-forming apparatus corresponding to the image-forming-apparatus information to-be-monitored may be an image-forming apparatus that has never been monitored, and 209 may continue to be executed.

In embodiments of the present disclosure, at least a part of the information may be the serial number of the image-forming apparatus.

At 208, the monitored image-forming-apparatus information may be updated, and the process may end.

In embodiments of the present disclosure, according to the serial number of the image-forming-apparatus information to-be-monitored, other information of the image-forming-apparatus information to-be-monitored may be determined as other information of the monitored image-forming-apparatus information. For example, the brand of the image-forming-apparatus information to-be-monitored may be determined as the brand of the monitored image-forming-apparatus information; the model of the image-forming-apparatus information to-be-monitored may be determined as the model of the monitored image-forming-apparatus information; and the IP address of the image-forming-apparatus information to-be-monitored may be determined as the IP address of the monitored image-forming-apparatus information.

At 209, the image-forming apparatus information to-be-monitored may be stored in the database, and the process may end.

In embodiments of the present disclosure, the internal storage apparatus may invoke the database service process to store the image-forming apparatus information to-be-monitored in the database. For example, the serial number, brand, model and IP address of the image-forming apparatus to-be-monitored may be stored in the database as a piece of image-forming-apparatus information, and the image-forming apparatus corresponding to the image-forming-apparatus information to-be-monitored may be monitored.

In embodiments of the present disclosure, the image-forming apparatus corresponding to the image-forming-apparatus information to-be-monitored selected by the user may be monitored, which may ensure that even if the IP address of the image-forming apparatus changes, the monitoring apparatus may obtain the image-forming-apparatus information of corresponding image-forming apparatus according to the IP address, thereby improving the reliability of the image-forming apparatus.

In solutions of embodiments of the present disclosure, the image-forming apparatus and image-forming-apparatus information in the local area network may be searched and read; the image-forming-apparatus information after search may be stored; the image-forming-apparatus information may be displayed for the user to select the image-forming-apparatus information to-be-monitored from the image-forming-apparatus information and to monitor the image-forming apparatus corresponding to the image-forming-apparatus information to-be-monitored. When the IP address of the image-forming apparatus changes, the monitoring apparatus may still query the image-forming apparatus, thereby improving the reliability of the image-forming apparatus.

Figure 6:
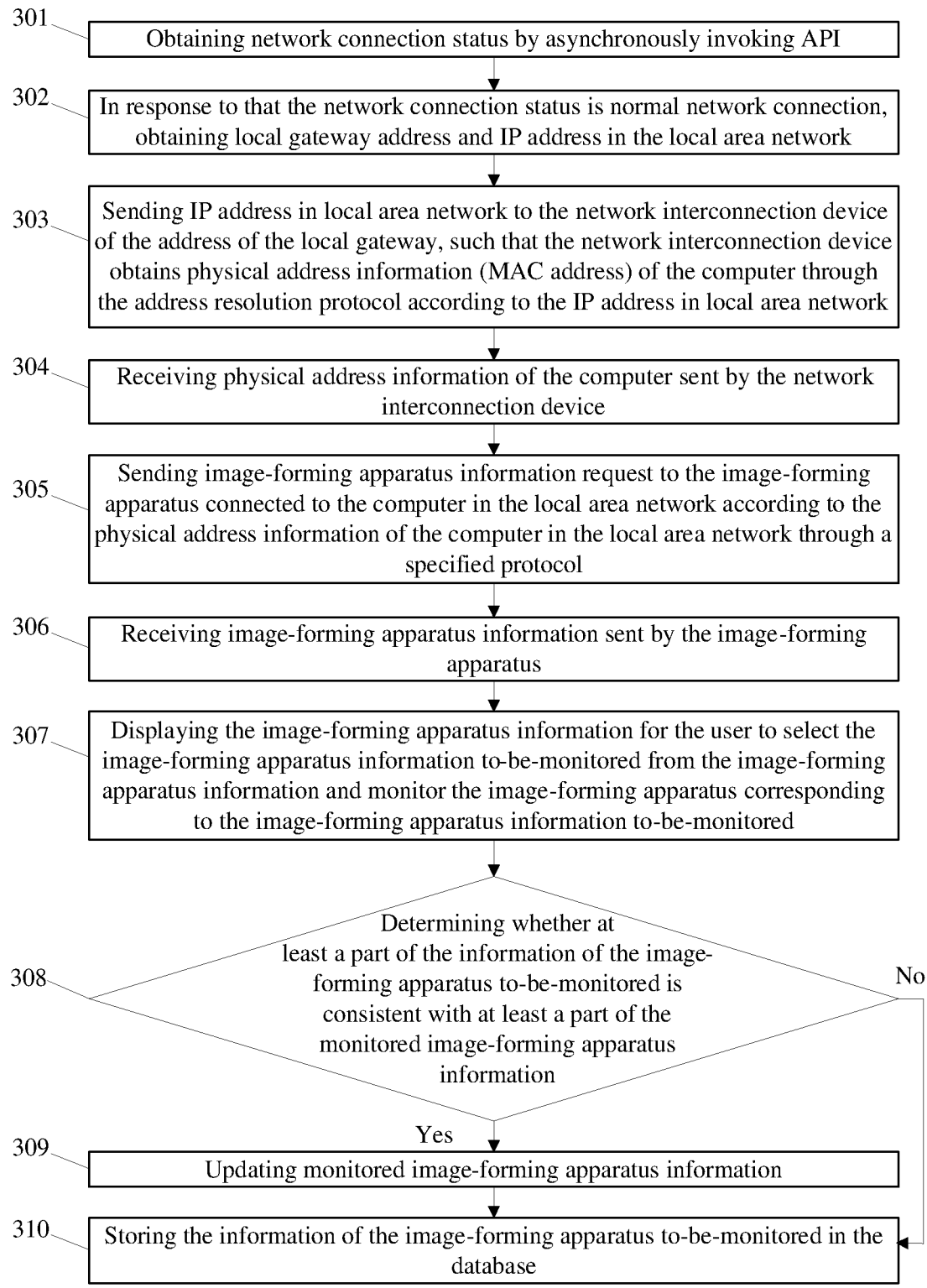
FIG. 6 illustrates another flowchart of a method for monitoring an image-forming apparatus according to exemplary embodiments of the present disclosure.

FIG. 6 illustrates another flowchart of a method for monitoring the image-forming apparatus according to exemplary embodiments of the present disclosure. As shown in FIG. 6, the method may include following exemplary steps.

At 301, the network connection status may be obtained by asynchronously invoking an application programming interface (API).

In embodiments of the present disclosure, 301 may be same as 201, which may refer to 201 for details and may not be described in detail herein.

At 302, in response to that the network connection status is normal network connection, local gateway address and IP address in the local area network may be obtained.

In embodiments of the present disclosure, the IP addresses may be all IP addresses in the local area network where the computer device is located. For example, the IP address in the local area network may be calculated according to local gateway address.

At 303, the IP address in the local area network may be sent to a network interconnection device of local gateway address, such that the network interconnection device may obtain physical address information (MAC address) of the computer through address resolution protocol (ARP) according to the IP address in the LAN.

In embodiments of the present disclosure, the address resolution protocol ARP may include a correspondence between an IP address and a MAC address. For example, the network interconnection device may read the MAC address corresponding to the IP address according to the IP address through the address resolution protocol ARP.

At 304, the physical address information of the computer sent by the network interconnection device may be received.

In embodiments of the present disclosure, the network interconnection device may send read MAC address to the monitoring apparatus, such that the monitoring apparatus may obtain the MAC address of the computer in the local area network.

At 305, the image-forming-apparatus information request may be sent to the image-forming apparatus connected to the computer in the local area network, according to the physical address information of the computer in the local area network, through a specified protocol.

In embodiments of the present disclosure, the image-forming apparatus may have network communication function.

In embodiments of the present disclosure, the specified protocol may be simple network management protocol (SNMP). For example, the device search module of the monitoring apparatus may send the image-forming-apparatus information request to the image-forming apparatus, which is connected to the computer in the local area network, through SNMP by invoking the search service process according to the MAC address, thereby requesting that the image-forming-apparatus information may be obtained.

At 306, the image-forming-apparatus information sent by the image-forming apparatus may be received.

In embodiments of the present disclosure, the image-forming-apparatus information may include, but may not be limited to, the serial number, brand, model and IP address of the image-forming apparatus. A serial number may be configured to uniquely identify one image-forming apparatus. The serial number of the image-forming apparatus may be fixed by the manufacturer in the memory of the image-forming apparatus and cannot be modified by the user. The serial number may be obtained through firmware communication of the image-forming apparatus. The serial number of image-forming apparatus fabricated may not be reused. In addition, each image-forming apparatus manufacturer may have a different manner of defining the serial number, such that it is accurate and reliable to use the serial number as the unique identifier of the image-forming apparatus.

At 307, the image-forming-apparatus information may be displayed for the user to select the image-forming-apparatus information to-be-monitored from the image-forming-apparatus information and to monitor the image-forming apparatus corresponding to the image-forming-apparatus information to-be-monitored.

At 308, it determines whether at least a part of the image-forming apparatus information to-be-monitored is consistent with at least a part of the monitored image-forming-apparatus information. If yes, 309 may be executed; if no, 310 may be executed.

At 309, the monitored image-forming-apparatus information may be updated, and the process may end.

At 310, the image-forming apparatus information to-be-monitored may be stored in the database, and the process may end.

In embodiments of the present disclosure, 307 to 310 may be same as 206 to 209, which may refer to 206 to 209 for details and may not be described in detail herein.

In solutions of embodiments of the present disclosure, the image-forming apparatus and image-forming-apparatus information in the local area network may be searched and read; the image-forming-apparatus information after search may be stored; the image-forming-apparatus information may be displayed for the user to select the image-forming-apparatus information to-be-monitored from the image-forming-apparatus information and to monitor the image-forming apparatus corresponding to the image-forming-apparatus information to-be-monitored. When the IP address of the image-forming apparatus changes, the monitoring apparatus may still query the image-forming apparatus, thereby improving the reliability of the image-forming apparatus.

Embodiments of the present disclosure provide a storage medium, where the storage medium may include a stored program. When the program is executed, the device where the storage medium is located may be controlled to execute exemplary steps of above-mentioned embodiments of the method for monitoring the image-forming apparatus, which may refer to above-mentioned embodiments of the method for monitoring the image-forming apparatus for description.

Embodiments of the present disclosure provide a computer device including a memory and a processor. The memory may be configured to store information including program instructions, and the processor may be configured to control the execution of the program instructions. When the program instructions are loaded and executed by the processor, exemplary steps of above-mentioned embodiments of the method for monitoring the image-forming apparatus may be implemented, which may refer to above-mentioned embodiments of the method for monitoring the image-forming apparatus for description.

Figure 7:
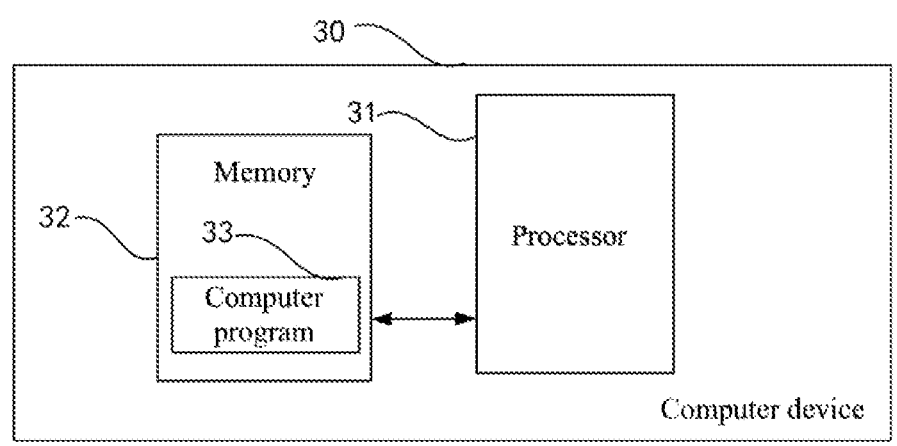
FIG. 7 illustrates a schematic of a computer device according to exemplary embodiments of the present disclosure.

FIG. 7 illustrates a schematic of a computer device according to exemplary embodiments of the present disclosure. The computer device 30 in one embodiment may include a processor 31, a memory 32, and a computer program 33 which may be stored in the memory 32 and operated on the processor 31. When the computer program 33 is executed by the processor 31, the method for monitoring the image-forming apparatus applied to embodiments of the present disclosure may be implemented, which may not be described in detail to avoid repetition. Or when the computer program is executed by the processor 31, the functions applied to each model/unit in the apparatus for monitoring the image-forming apparatus in embodiments of the present disclosure may be implemented, which may not be described in detail to avoid repetition.

The computer device 30 may include, but may not be limited to, the processor 31 and the memory 32. Those skilled in the art may understand that FIG. 7 may be only an example of the computer device 30, which may not limit the computer device 30. The computer device 30 may include more or less components than shown in the drawings, or combine certain components, or include different components. For example, the computer device may also include input and output devices, network access devices, buses, and the like. The processor 31 may be a central processing unit (CPU), and may also be other general-purpose processor, a digital signal processor (DSP), an application specific integrated circuit (ASIC), a field programmable gate array (FPGA) or other programmable logic device, a discrete gate or transistor logic device, a discrete hardware component, and the like. A general-purpose processor may be a microprocessor, or the processor may be any conventional processor or the like.

The memory 32 may be an internal storage unit of the computer device 30, such as a hard disk or a memory of the computer device 30. The memory 32 may also be an external storage apparatus of the computer device 30, such as a plug-in hard disk equipped on the computer device 30, a smart media (SM) card, a secure digital (SD) card, a flash memory card and the like. Furthermore, the memory 32 may also include both an internal storage unit of the computer device 30 and an external storage apparatus. The memory 32 may be configured to store computer programs and other programs and data required by the computer device. The memory 32 may also be configured to temporarily store data that has been outputted or will be outputted.

In some embodiments provided in the present disclosure, it should be understood that disclosed system, apparatus and method may be implemented in other manners. For example, an apparatus embodiments described above may be only exemplary. For example, the division of the unit may be only a logical function division, and there may be another division manner during actual implementation. For example, multiple units or parts may be combined or integrated into another system, or some features may be omitted or not implemented. In addition, mutual coupling or direct coupling or communication connection shown or discussed above may be indirect coupling or communication connection through some interfaces, apparatus or units; and may be electrical, mechanical or other manners.

The units described as separate components may or may not be physically separated, and the components displayed as units may or may not be physical units, that is, may be located in one place or may also be distributed to multiple network elements. A part or all of the units may be selected according to actual needs to achieve the objective of the solutions according to embodiments of the present disclosure.

Furthermore, each functional unit in each embodiment of the present disclosure may be integrated into one processing unit, each unit may exist physically to be separated, or two or more units may be integrated into one unit. Above-mentioned integrated units may be implemented in the form of hardware, or in the form of hardware and software functional units.

From above-mentioned embodiments, it may be seen that the solutions according to the present disclosure may achieve at least following beneficial effects.

In solutions of embodiments of the present disclosure, the image-forming apparatus and image-forming-apparatus information in the local area network may be searched and read; the image-forming-apparatus information after search may be stored; the image-forming-apparatus information may be displayed for the user to select the image-forming-apparatus information to-be-monitored from the image-forming-apparatus information and to monitor the image-forming apparatus corresponding to the image-forming-apparatus information to-be-monitored. When the IP address of the image-forming apparatus changes, the monitoring apparatus may still query the image-forming apparatus, thereby improving the reliability of the image-forming apparatus.

Above-mentioned embodiments of the present disclosure may be exemplary and may not be intended to limit the present disclosure. Any modifications, equivalent replacements, improvements and the like made within the spirit and principles of the present disclosure shall be included within the protection scope of the present disclosure.

What is claimed is:

1. An apparatus for monitoring an image-forming apparatus, comprising:
 a device search module, configured to perform a search and read process by using simple network management protocol (SNMP) to discover and retrieve an image-forming apparatus and image-forming-apparatus information in a local area network, wherein the search and read process includes obtaining a local gateway address in the local area network according to a specified time interval;
 an internal storage apparatus, configured to store the image-forming-apparatus information after search;
 a display interface, configured to display the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored; and
 a determination unit, configured to determine whether the user selected image-forming-apparatus information matches at least a part of the image-forming-apparatus information of any monitored image-forming apparatus; and if a match is determined, configured to update the image-forming-apparatus information of the corresponding monitored image-forming apparatus, such that an image-forming-apparatus information change of the corresponding monitored image-forming apparatus is updated automatically,
 wherein for the search and read process, the device search module is configured to calculate an IP address in the local area network according to the local gateway address.

2. The apparatus according to claim 1, wherein:
 for the search and read process, the device search module is configured to send an image-forming-apparatus information request to the IP address in the local area network through a specified protocol, and receive the image-forming-apparatus information.

3. The apparatus according to claim 1, wherein:
 for the search and read process, the device search module is configured to:
  obtain the IP address in the local area network;
  send the IP address in the local area network to a network interconnection device of the local gateway address for the network interconnection device to obtain physical address information of a computer through an address resolution protocol according to the IP address in the local area network;
  receive the physical address information of the computer sent by the network interconnection device;
  send an image-forming-apparatus information request to an image-forming apparatus connected to the computer in the local area network according to the physical address information of the computer in the local area network through a specified protocol; and
  receive the image-forming-apparatus information sent by the image-forming apparatus.

4. The apparatus according to claim 1, wherein:
 the image-forming-apparatus information includes at least an IP address of the image-forming-apparatus.

5. The apparatus according to claim 4, wherein:
 the image-forming-apparatus discovered in the search and read process includes an IP address that is different from the IP address of any monitored image-forming apparatus.

6. The apparatus according to claim 5, wherein:
 an IP address change of any monitored image-forming apparatus is updated automatically by the determination unit.

7. A method for monitoring an image-forming apparatus, comprising:
 performing a search and read process by using simple network management protocol (SNMP) to discover and retrieve an image-forming apparatus and image-forming-apparatus information in a local area network, wherein the search and read process includes obtaining a local gateway address in the local area network according to a specified time interval and calculating an IP address in the local area network according to the local gateway address;

storing the image-forming-apparatus information after search;

displaying the image-forming-apparatus information stored in the internal storage apparatus for a user to select image-forming-apparatus information to-be-monitored from the image-forming-apparatus information and monitoring an image-forming apparatus corresponding to the image-forming-apparatus information to-be-monitored; and determining whether the user selected image-forming-apparatus information matches at least a part of the image-forming-apparatus information of any monitored image-forming apparatus; and if a match is determined, updating the image-forming-apparatus information of the corresponding monitored image-forming apparatus, such that an image-forming-apparatus information change of the corresponding monitored image-forming apparatus is updated automatically.

8. The method according to claim 7, wherein the search and read process further includes:

sending an image-forming-apparatus information request to the IP address in the local area network through a specified protocol, and receiving the image-forming-apparatus information.

9. The method according to claim 7, wherein the search and read process further includes:

obtaining the IP address in the local area network;

sending the IP address in the local area network to a network interconnection device of the local gateway address for the network interconnection device to obtain physical address information of a computer through an address resolution protocol according to the IP address in the local area network;

receiving the physical address information of the computer sent by the network interconnection device;

sending an image-forming-apparatus information request to an image-forming apparatus connected to the computer in the local area network according to the physical address information of the computer in the local area network through a specified protocol; and receiving the image-forming-apparatus information sent by the image-forming apparatus.

10. A system for monitoring an image-forming apparatus, comprising:

a computer device and an image-forming apparatus, wherein:

the computer device is installed with an apparatus for monitoring the image-forming apparatus and includes a resident memory process; and the apparatus for monitoring the image-forming apparatus includes a device search module, configured to perform a search and read process by using simple network management protocol (SNMP) to discover and retrieve an image-forming apparatus and image-forming-apparatus information in a local area network, wherein the search and read process includes obtaining a local gateway address in the local area network according to a specified time interval and calculating an IP address in the local area network according to the local gateway address; an internal storage apparatus, configured to store the image-forming-apparatus information after search; a display interface, configured to display the image-forming-apparatus information stored in the internal storage apparatus for a user to select image-forming-apparatus information to-be-monitored from the image-forming-apparatus information and to monitor an image-forming apparatus corresponding to the image-forming-apparatus information to-be-monitored; and a determination unit, configured to determine whether the user selected image-forming-apparatus information matches at least a part of the image-forming-apparatus information of any monitored image-forming apparatus; and if a match is determined, configured to update the image-forming-apparatus information of the corresponding monitored image-forming apparatus, such that an image-forming-apparatus information change of the corresponding monitored image-forming apparatus is updated automatically.

11. The system according to claim 10, wherein:

for the search and read process, the device search module is configured to send an image-forming-apparatus information request to the IP address in the local area network through a specified protocol, and receive the image-forming-apparatus information.

12. The system according to claim 10, wherein:

for the search and read process, the device search module is configured to:

obtain the IP address in the local area network;

send the IP address in the local area network to a network interconnection device of the local gateway address for the network interconnection device to obtain physical address information of a computer through an address resolution protocol according to the IP address in the local area network;

receive the physical address information of the computer sent by the network interconnection device;

send an image-forming-apparatus information request to an image-forming apparatus connected to the computer in the local area network according to the physical address information of the computer in the local area network through a specified protocol; and receive the image-forming-apparatus information sent by the image-forming apparatus.

* * * * *